Dec. 27, 1927.
O. LAMBERT
1,654,376
OVERHEAD GEAR DRIVEN SPINDLE MECHANISM FOR SPINNING AND LIKE MACHINES
Filed April 7, 1927
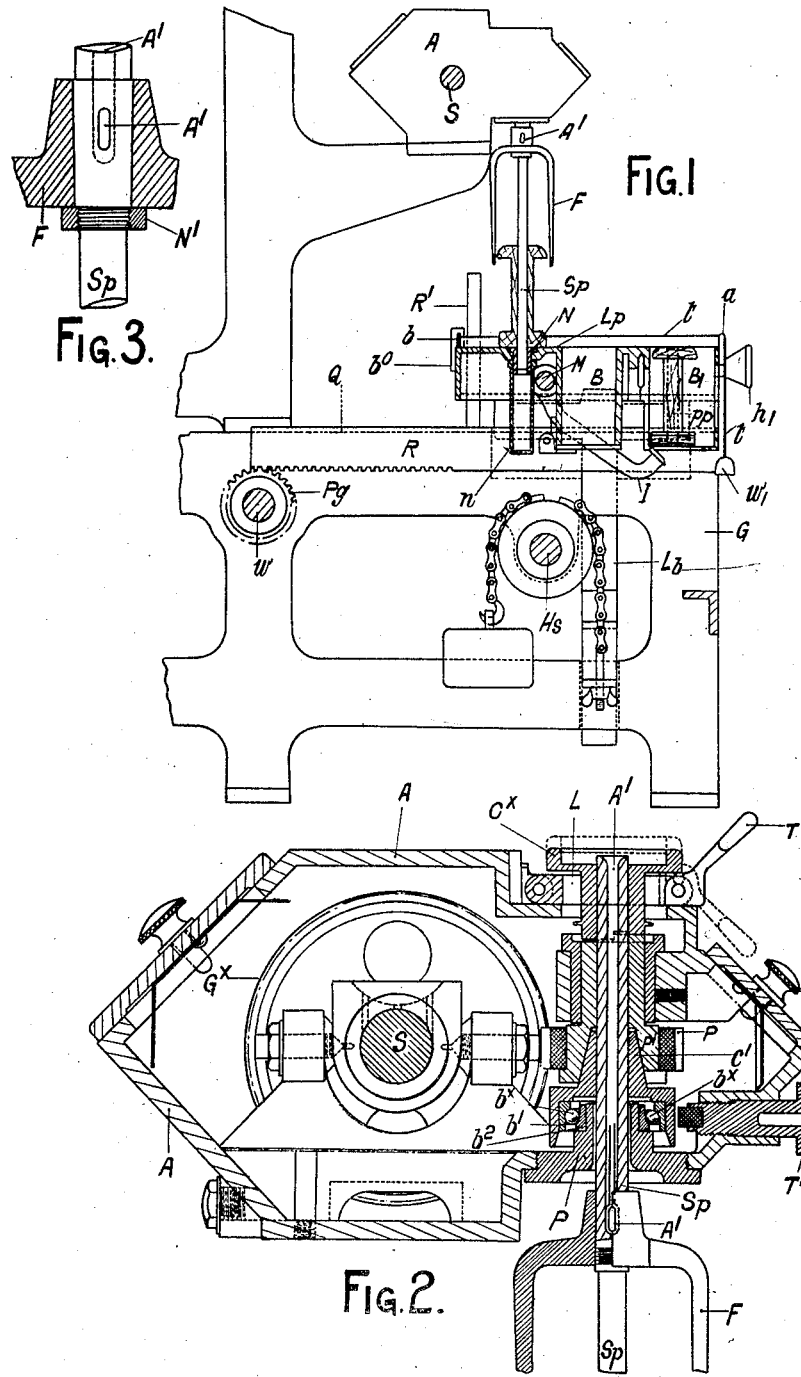
Inventor:
O. Lambert Patented Dec. 27, 1927.

1,654,376

UNITED STATES PATENT OFFICE.

OSWALD LAMBERT, OF TAMISE, BELGIUM, ASSIGNOR TO JAMES F. LOW & COMPANY, LIMITED, OF MONIFIETH, SCOTLAND.

OVERHEAD GEAR-DRIVEN SPINDLE MECHANISM FOR SPINNING AND LIKE MACHINES.

Application filed April 7, 1927, Serial No. 181,850, and in Great Britain May 7, 1926.

This invention relates to spinning, twisting and like frames, particularly for the cotton, jute, hemp and flax spinning and twisting industries.

The invention comprises an overhead gear driven spindle mechanism incorporating a vertical spindle supported by bearings and extending downwardly through an oil box or casing, the arrangement being such that, notwithstanding the absence of packing or of a sealed joint, oil for lubrication of the bearings and of the driving means is prevented from escaping from the interior of the casing, while a self-lubricated neck or bearing to receive the lower end of the spindle serves to render the live spindle rigid. The driving means within the box or casing provides both a friction drive and a positive drive rendered effective by movement of a clutch member endwise of the spindle into engagement with a clutch member presented by a driven element on the spindle.

In the accompanying drawings which illustrate the invention Fig. 1 is a part elevation part vertical section showing clearly the spindle and certain elements of the doffing mechanism. Fig. 2 is a vertical section to a larger scale of the spindle and its driving mechanism. Fig. 3 is a detail view showing an alternative means of attachment of the flyer to the spindle.

It is to be understood that the spindles are driven individually.

As shown, gears such as $G^x$ on the shaft S, which revolves in ball bearings and penetrates vertical side walls of the oil box or casing A, drive pinions such as P, each fixed to a boss $P^1$ freely mounted on a hollow spindle $Sp$ and operatively connected thereto by a clutch element $C^x$ slidable along the upper portion of the spindle $Sp$, but connected to the spindle, as by key and slot, for rotation therewith. The lower part of the boss $P^1$ is formed with a conical recess to mate with a coned friction member $C^1$ fixed to the spindle $Sp$. When the clutch element $C^x$ is lifted out of engagement with the boss $P^1$, the friction between the contacting conical surfaces of the boss $P^1$ and the member $C^1$ is sufficient to effect rotation of the spindle $Sp$, unless a given resistance is offered to the rotation of the spindle. This resistance may be imparted, if required, by screwing in the plunger $T^1$, the fibre nose of which comes into contact with the lower portion of the member $C^1$ and thus stops the rotation of the spindle.

The lower part of the member $C^1$ holds the outer member $b^1$ of a ball race, the inner member $b^2$ of which ball race is fixed to a plug or spigot $p$, coaxial with the spindle and threaded into the bottom wall of the box or casing A. Balls $b^x$ between the race members $b^1$ and $b^2$ afford a ball bearing.

The upper portion of the boss $P^1$ may revolve in a ball race or in a phosphor-bronze bearing as shown.

On the upper end of the boss $P^1$ is a recess engageable by a tooth on the clutch element $C^x$. The lifting or lowering of the clutch element $C^x$ effects the disengagement of the clutch tooth from the recess or the engagement of the tooth in the recess and thus the disengagement of the boss $P^1$ from, or its engagement with, the spindle $Sp$.

The clutch element $C^x$ is adapted to be lifted or lowered by operation of a bifurcated lever L, pivoted at one end on the casing A and provided at its opposite end with a thumbpiece T for manual operation.

Oil for lubrication contained in the casing A which may be projected on to the ball race member $b^2$ is thrown on to the outer member $b^1$ of the ball race by centrifugal force and is thus prevented from escaping from the casing A. To prevent the oil in the casing A from rising beyond the level required, an overflow is provided in the casing. The normal oil level is shown by the chain dotted line in Fig. 2, being below the lower ball bearing $b^x$, $b^1$, $b^2$.

The flyer F is attached to the spindle $Sp$ by a cone and screw as shown in Fig. 2. A conduit $A^1$ is formed in the spindle $Sp$ and also in the top part of the flyer F.

To connect the yarn, a certain length is unwound from the bobbin and passed through an eye at the flyer end, wound round the leg of the flyer in the usual manner and passed through the conduit $A^1$ in the flyer top and spindle by means of a needle and drawn up through the hollow portion of the spindle. It may then be tied to the other portion of the yarn as in usual practice.

An alternative means of fixing the flyer to the spindle is shown in Fig. 3. The conical sleeve of the flyer top is held in position on the corresponding conical section of the spindle by means of the nut $N^1$.

The lower part of the spindle $Sp$, after doffing, is held rigidly in a neck or bearing N fixed in a lifter plate $Lp$ and provided at its lower end with a tube $n$ containing oil, ensuring lubrication of the spindle $Sp$ at each ascent of the lifter plate. The lower end of the spindle $Sp$ may be slightly tapered to guide it in the neck N after the doffing operation.

What I claim is:—

In overhead spindle driving mechanism for spinning, twisting and like frames, in combination, an oil casing, a vertical spindle extending through said casing, a bearing within said casing for supporting said spindle, said bearing comprising an inner race member sustained by the bottom wall of said casing, a co-operative outer race member and conical friction clutch element sustained by said spindle above said inner race member, a gear driven unit mounted on said spindle above said clutch element and presenting on its under side a conical friction member above said clutch element and permanently engaged with said clutch element, said unit presenting on its upper side a positive clutch member, a positive clutch element slidable on said spindle above and co-operative with said positive clutch member and manually operable means exterior to said casing for imparting sliding movement to said positive clutch element.

In testimony whereof I have signed my name to this specification.

O. LAMBERT.